United States Patent [19]

Rumpel

[11] Patent Number: 4,458,918
[45] Date of Patent: Jul. 10, 1984

[54] REAR WHEEL SUSPENSION WITH A TRANSVERSE LEAF SPRING

[75] Inventor: Manfred Rumpel, Birmingham, Mich.

[73] Assignee: Ford Motor Company, Dearborn, Mich.

[21] Appl. No.: 334,294

[22] Filed: Dec. 24, 1981

[51] Int. Cl.³ .......................................... B60G 11/08
[52] U.S. Cl. ................................... 280/719; 280/720; 267/56; 267/54 A
[58] Field of Search ...................... 280/93, 95 R, 96.1, 280/660, 669, 699, 719, 700 US, 701 US, 720; 267/36 R, 54 A, 54 B, 54 R, 56; 301/133 US, 136

[56] References Cited

U.S. PATENT DOCUMENTS

| | | | |
|---|---|---|---|
| 2,018,653 | 10/1935 | Best | 280/95 R |
| 2,179,856 | 11/1939 | Leighton | 29/149.5 |
| 2,200,177 | 5/1940 | Klavík | 280/669 |
| 2,250,247 | 7/1941 | Ballamy | 267/45 |
| 2,999,679 | 9/1961 | Ulderup et al. | 267/56 |
| 3,030,101 | 4/1962 | McIntosh | 267/54 A |
| 3,149,855 | 9/1964 | Adloff et al. | 280/669 |
| 3,170,682 | 2/1965 | Eggers | 267/52 |
| 3,181,641 | 5/1965 | Haddad | 180/42 |
| 3,759,542 | 9/1973 | Löffler | 180/73.4 |
| 3,913,941 | 10/1975 | Guerriero | 280/124 |
| 4,245,853 | 1/1981 | Inoue et al. | 280/701 |

FOREIGN PATENT DOCUMENTS

| | | | |
|---|---|---|---|
| 1101181 | 11/1958 | Fed. Rep. of Germany . | |
| 1141546 | 12/1962 | Fed. Rep. of Germany . | |
| 1973260 | 9/1967 | Fed. Rep. of Germany . | |
| 1805219 | 5/1969 | Fed. Rep. of Germany | 280/669 |
| 1924175 | 11/1969 | Fed. Rep. of Germany | 280/669 |
| 2,927,486 | 1/1981 | Fed. Rep. of Germany | 280/719 |
| 1009361 | 6/1948 | France . | |
| 2005171 | 3/1969 | France . | |
| 1597358 | 6/1970 | France . | |
| 387465 | 5/1965 | Switzerland . | |
| 658880 | 10/1951 | United Kingdom | 280/669 |

OTHER PUBLICATIONS

Patent Abstracts of Japan, vol. 5 No. 119 (M-81)[791] Jul. 31, 1981.

*Primary Examiner*—Robert B. Reeves
*Assistant Examiner*—Dennis H. Pedder
*Attorney, Agent, or Firm*—Jerome R. Drouillard; Roger L. May

[57] ABSTRACT

A rear wheel suspension for a motor vehicle having front wheel drive includes a telescopic strut rigidly mounted to a wheel support member and having its upper end pivotably mounted to the vehicle chassis. Two laterally extending control arms are pivotably connected at their outboard ends to the wheel support member and at their inboard ends to the vehicle chassis. The two control arms are spaced and have a spring seat bracket pivotably mounted therebetween which seats an outer end of a transverse leaf spring interposed between the bracket and the vehicle chassis. The spring seat is pivotable with respect to the control arms to allow the control arms to undergo jounce and rebound movement while maintaining the spring seat bracket in a near horizontal position. In addition, the spring seat bracket allows the control arms to control the toe angle of the rear wheel during recession of the rear wheel as well as evenly distributes the leaf spring load onto the two arms.

9 Claims, 4 Drawing Figures

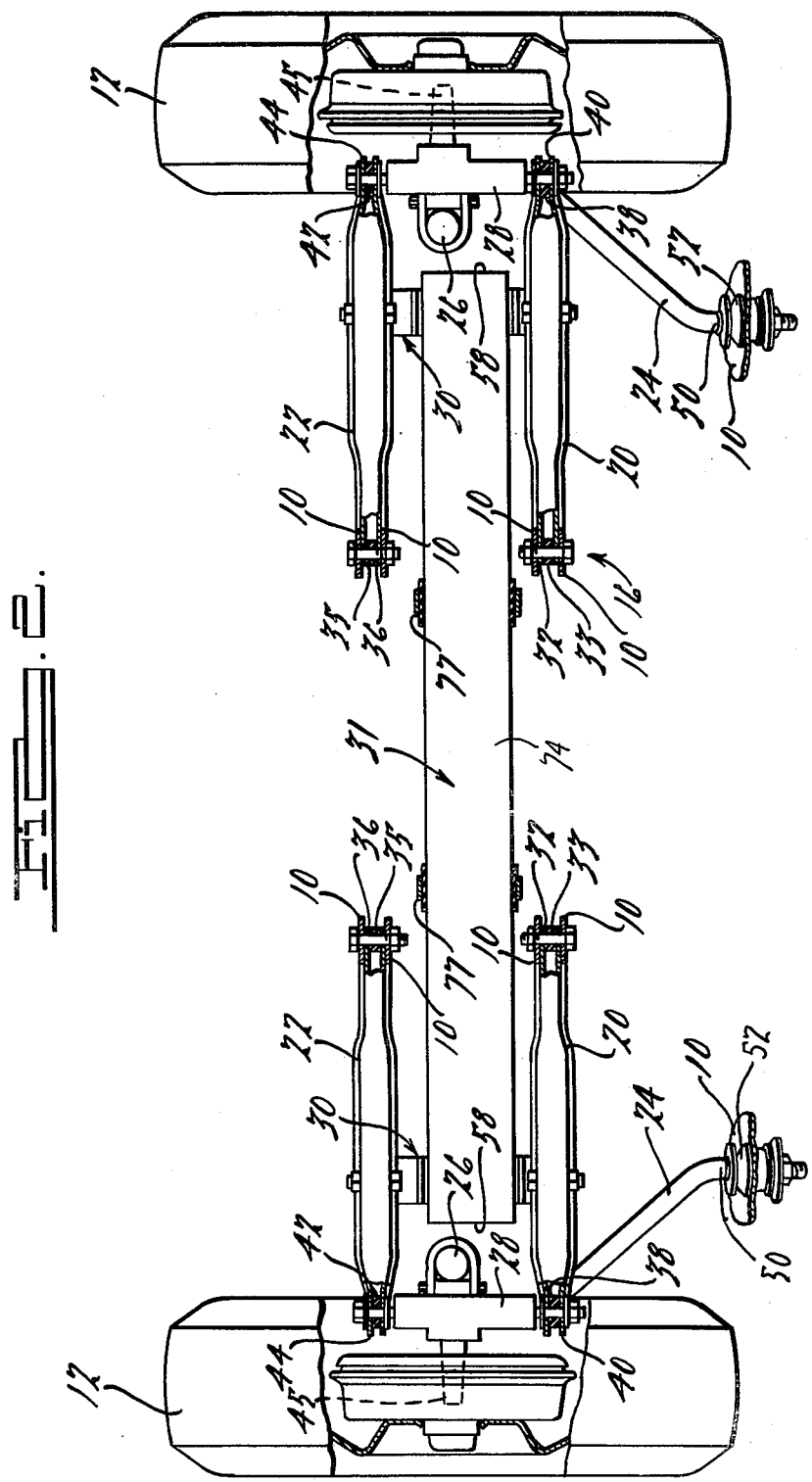

REAR WHEEL SUSPENSION WITH A TRANSVERSE LEAF SPRING

BACKGROUND OF THE INVENTION

1. Field of the Invention

This invention relates generally to wheel suspension systems for motor vehicles and more particularly to a strut type rear suspension for a front wheel drive vehicle.

2. Disclosure Information

Rear suspension systems have been constructed to control the attitude of the rear wheels in order to provide particular handling characteristics of the motor vehicle, for example roll understeer or roll oversteer, as well as to provide a soft ride free from road vibrations. Handling characteristics such as roll understeer, roll oversteer or roll neutral steer during cornering of a motor vehicle are achieved by controlling the toe angle of one of the rear wheels during the jounce stroke of the suspension.

A vibration free ride is enhanced if the rear wheels are allowed to recess when the wheel hits a bump. However, both wheel recession and steering stability must be taken into account when designing a rear suspension. One way to take both factors into account is by controlling the toe angle of the wheel during its recession.

One way to control the toe angle of a wheel is with a suspension having two control arms substantially transverse to the longitudinal axis of the vehicle. The arms control the toe angle changes of the wheels as they shift postion.

However, previous usage of the two transverse control arms in combination with a strut suspension necessitated the spring element in the strut suspension to be mounted about the strut.

In many strut suspensions, the spring has been positioned away from the strut and interposed between a transverse control arm and the chassis so that the strut upper mount may be constructed from softer rubber, and secondly, valuable cargo space or engine compartment space may be maximized.

SUMMARY OF THE DISCLOSURE

In accordance with the present invention, a rear wheel suspension for a vehicle includes a chassis, two wheel support members, two telescopic shock absorbing sturts each rigidly secured at its lower end to a respective wheel support member and connected at its upper end to the chassis, and a pair of left and right control arms. The left and right pairs of control arms are pivotably connected to the chassis and a respective wheel support member. The control arms of each pair are longitudinally spaced from each other and substantially transverse to the longitudinal axis of the motor vehicle. A spring seat is pivotably mounted to the control arms of each pair and extends therebetween for seating an outer end of a transverse leaf spring. The middle portion of the leaf spring is mounted to the chassis of the motor vehicle.

It is desirable that the pivotable connection between each spring seat and each control arm includes a rubber bushing that resiliently flexes under side loads exerted thereon. It is also preferable that each spring seat pivots with respect to the control arms such that the spring seat remains in a substantially horizontal position when the control arms undergo large jounce and large rebound movement.

The broader aspects of the present invention are directed to a chassis, two wheel support members, and front and rear transverse control arms connecting each wheel support member to the chassis. The control arms are pivotably connected at their inboard ends and their outboard ends to the chassis and wheel support member, respectively. A spring seat is pivotably connected to at least one of each pair of arms and seats a spring means interposed between the spring seat and the chassis.

A suspension according to the present invention provides for increased cargo or engine space. Secondly, the suspension isolates vibration between the control arms and the leaf spring. Thirdly, it allows the use of softer rubber in the strut upper mount. Furthermore, it provides the above features in a suspension that can provide roll understeer, roll oversteer or roll neutral steer, as well as wheel recession.

BRIEF DESCRIPTION OF THE DRAWINGS

Reference is now made to the accompanying drawings in which:

FIG. 2 is a plan and partially segmented view of the rear wheel suspension shown in FIG. 1;

DETAILED DESCRIPTION OF THE PREFERRED EMBODIMENTS

Figure 1:
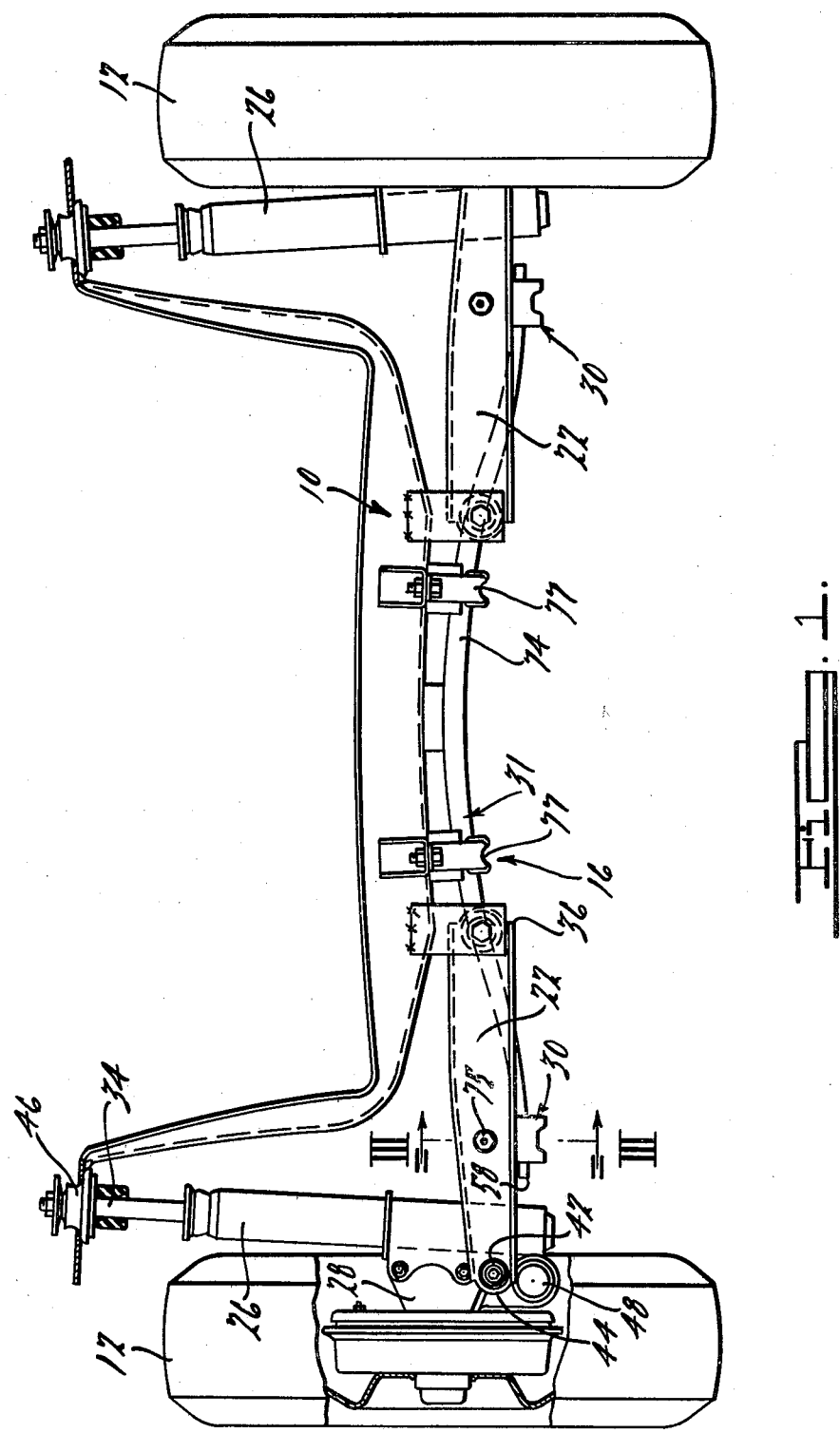
FIG. 1 is a rear elevational view, partly in section, of a motor vehicle incorporating a rear wheel suspension for its left and right rear wheels according to the invention.

Generally, as shown in FIGS. 1 and 2, a motor vehicle chassis 10 (or unitized body and chassis) is supported on left and right road wheels 12 by a novel wheel suspension 16. The wheel suspension 16 includes a pair of front transverse control arms 20, a pair of rear transverse control arms 22, a pair of trailing arms 24, and a pair of telescopic struts 26. Each strut 26 connects a wheel support member 28 to the motor vehicle chassis 10. Means are provided to pivotably connect the inner ends 33 and 36 of the arms 20, 22 to the chassis 10 and their outer ends to a respective wheel support member 28, as will be described. A spring seat bracket 30 is pivotably mounted to each pair of arms 20 and 22 and seats the outer ends of a transverse leaf spring 31 interposed between the bracket 30 and chassis 10.

Each front arm 20 has an elastomeric bushing 32 at its inboard end 33 which pivotably connects each arm 20 to the chassis 10. Similarly, each rear arm 22 has a similar bushing 35 at its inboard end 36 which pivotably connects the arm 22 to the chassis 10. An elastomeric bushing 38 pivotably connects the outboard end 40 of each front control arm 20 to the respective wheel support member 28. Similarly, a resilient bushing 42 pivotably connects outboard end 44 of each rear control arm 22 to the respective wheel support member 28.

Each wheel support member 28 has an integral wheel spindle 45 which rotatably mounts one of the rear wheels 12. Each spindle 45 is positioned between the outer ends 40 and 44 of arms 20 and 22. Each wheel support member 28 is rigidly connected to a respective telescopic shock absorbing strut 26. The upper end 34 of each strut 26 is pivotably connected through a resilient upper mount 46 to the chassis 10.

Each longitudinal trailing arm 24 is connected through an elastomeric bushing 48 to the respective wheel support member 28 and extends substantially forward therefrom. Each arm 24 has its front end 50 resiliently connected through a bushing 52 to the chassis 10.

Figure 3:
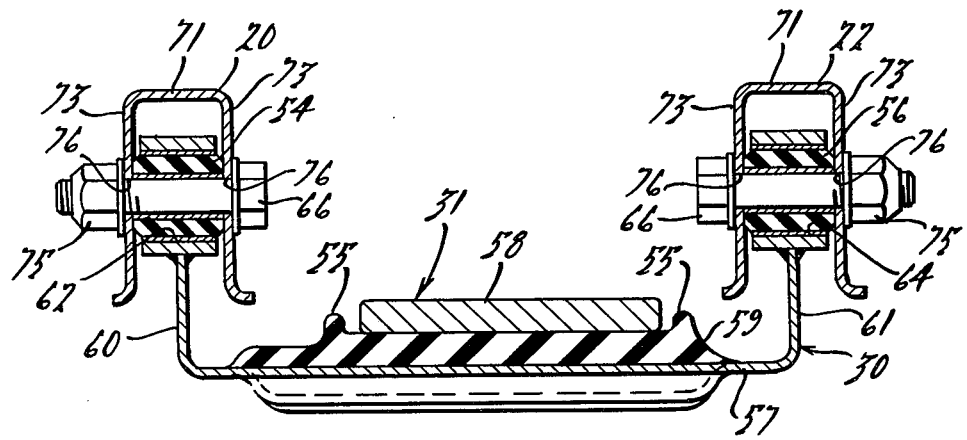
FIG. 3 is a cross-sectional view taken along the line 3—3 shown in FIG. 1.

Referring now to FIGS. 2 and 3, each spring seat bracket 30 is pivotably connected through elastomeric bushings 54 and 56 to the front control arms 20 and rear control arms 22, respectively, at a mid-position between the inboard ends 33 and 36 and outboard ends 40 and 44 of the arms 20 and 22. The spring seat bracket 30, as shown in FIG. 3, has a central seat 57 constructed to seat the outer end 58 of transverse leaf spring 31.

A layer of elastomeric material 59 is interposed between seat 57 and leaf spring end 58. The elastomeric layer 59 has two upwardly extending ridges 55 which prevent the leaf spring end 58 from excessive lateral displacement with respect to the bracket 30.

The bracket 30 has two upwardly extending ends 60 and 61 which have longitudinally aligned apertures 62 and 64 therethrough which receive the elastomeric bushings 54 and 56 respectively. Each control arm 20 and 22 has a U-shaped cross-section with a top wall 71 and two depending side walls 73. The two side walls 73 are spaced apart to receive the ends 60 and 61 that house bushings 54 and 56. Bolts 66 pass through apertures 76 in the side walls 73 and through bushings 54 and 56 to pivotably connect bracket 30 to arms 20 and 22 respectively and are secured to the arms by nuts 75.

As shown in FIG. 1, the midsection 74 of leaf spring 31 is secured to the chassis 10 by means of resilient bushing assemblies 77 in a conventional fashion so that the leaf spring 31 normally exerts a downwardly biasing force on the spring seat bracket 30 and control arms 20 and 22 when the vehicle is at rest.

When the control arms 20 and 22 undergo jounce movement, the arms 20 and 22 pivot upwardly about the inboard bushings 32 and 35. As the arms 20 and 22 pivot upwardly, the spring seat bracket 30 is moved upward with the arms 20 and 22 to flex the outer ends 58 of leaf spring 31 upwardly. In addition, the spring seat bracket 30 pivots about bushings 54 and 56 to remain in a rear horizontal position.

Similarly, when the control arms 20 and 22 undergo rebound movement and pivot downwardly about inboard bushings 32 and 35, the bracket 30 pivots about bushings 54 and 56 to maintain its near horizontal position as it moves downwardly and allows the outer ends 58 of leaf spring 31 to flex downwardly.

Arms 20 and 22 and the other suspension components may be arranged to provide an increase in toe-in during jounce of wheels 12. Alternatively, no toe change or toe-out of the wheel can be provided during jounce. One skilled in the art can provide the appropriate geometry of the various suspension arms that will provide the desired toe angle changes during jounce.

The plurality of resilient bushings in the suspension system allows the road wheel to recess when subjected to a longitudinal force such as occurs when the wheel strikes a road obstacle (e.g., a tar strip in concrete pavement). The control arms 20 and 22 control the toe angle of the rear wheel 12 during recession of the wheel. Arms 20 and 22 and the other suspension components may be arranged to provide no toe change during recession of the wheel. Alternatively, the arms 20 and 22 may be arranged to provide toe-in as the wheel undergoes recession. The elastomeric bushings 54 and 56 that mount the spring bracket 30 to the control arms are resilient to allow the spring seat bracket 30 to pivot with respect to the control arms 20 and 22 about vertical axes when the rear wheels 12 undergo recession. When wheel 12 regains its normal position, as shown in FIG. 2, each spring seat bracket 30 under the biasing influence of elastomeric bushings 54 and 56 pivots back to its initial position.

In other words, the spring seat bracket does not interfere with the vertical or horizontal movement of the control arms. Thusly, the spring seat bracket does not interfere with the toe angle of wheels 12 controlled by the control arms 20 and 22 during roll of the vehicle or recession of the wheels.

Another advantage provided for in the suspension 16 is the interposition of bushing 54 and 56 between the spring 31 and the control arms 20 and 22 as well as the interposition of elastomeric layer 59. The bushings 54 and 56 and elastomeric layer 59 can absorb small high frequency vibrations which may otherwise pass from the control arms to the spring 31 and up to the chassis 10. As also shown in the figures, the position of the leaf spring near the control arms rather than having a coil spring about the strut 26 provides for increased cargo or engine space since the clearance about strut 26 can be minimized.

Furthermore, because the spring loads arms 20 and 22, and not mount 46, softer rubber can be used in upper mount 46 than would otherwise be feasible.

The force of spring 31 is directed to both arms 20 and 22 in equal amounts. The arms, by being connected to the wheel support member 28 on opposite sides of the spindle 45, produce virtually no torque on the wheel support member. The even distribution of the spring force on the wheel support member promotes a vibration free ride.

Figure 4:
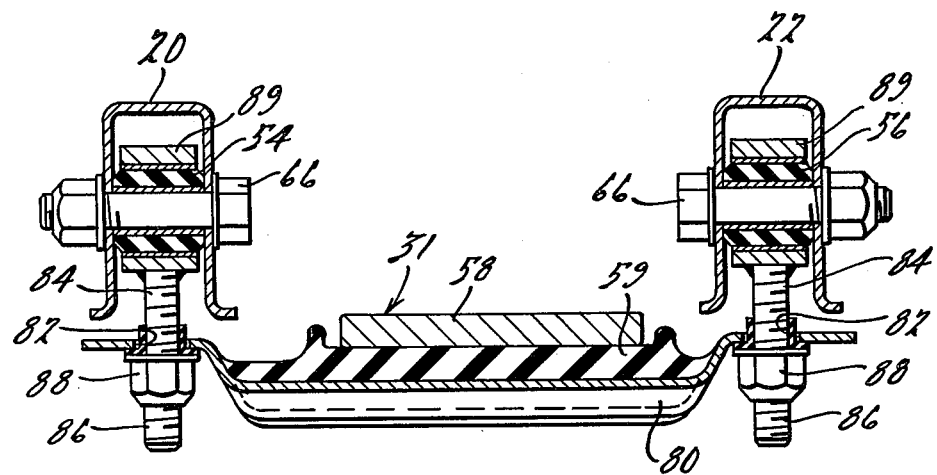
FIG. 4 is a cross-sectional view similar to FIG. 3 of a second embodiment according to the invention.

Reference now will be made to FIG. 4 which discloses a second embodiment. To simplify the discussion, parts that are identical to parts described in the first embodiment are referred to with the same numeral.

The second embodiment has a central spring seat plate 80 which seats the lower end 58 of leaf spring 31. The spring seat plate 80 has two apertures 82 near each end thereof which receive vertically extending supports 84 having threaded lower ends 86. The threaded ends 86 are secured to the plate 80 by nuts 88. The top end 89 of each support 84 is adapted to receive the bushings 54 and 56 which are pivotably mounted to the control arms 20 and 22 in the same fashion as the first embodiment. Similarly, a layer 59 of elastomeric material is interposed between the seat plate 80 and end 58 of leaf spring 31.

If a completely independent rear wheel suspension is desired, two half-length leaf springs can be substituted for the leaf spring 31 which extends between both brackets 30.

In this fashion, the suspension as described provides for increased cargo or engine space, a means of vibration isolation between the conrol arms and the spring, allows softer rubber to be used in the strut upper mount, and can be constructed to provide roll understeer, roll oversteer, or roll neutral steer, as well as wheel recession.

Variations and modifications of the present invention are possible without departing from its spirit and scope as defined by the appended claims.

The embodiments in which an exclusive property or privilege is claimed are defined as follows:

1. A rear wheel suspension for a vehicle comprising:
   a chassis;
   a wheel support member for rotatably mounting a road wheel;
   an upwardly extending telescopic shock absorber having its lower end rigidly secured to said wheel support member;
   means pivotably connecting the upper end of said shock absorber to said chassis;
   transversely extending front and rear control arms pivotably connected at their inboard ends to said chassis and at their outboard ends to said wheel support member;
   a spring seat means pivotably connected to said arms such that said control arms are allowed to pivot relative to said spring seat means about substantially vertical axes as said road wheel recesses; and
   a transverse leaf spring interposed between said spring seat means and said chassis with said leaf spring attached to said chassis at a laterally inward position from said spring seat means.

2. A rear wheel suspension as defined in claim 1 further comprising:
   a longitudinal link having one end connected to said chassis and its other end connected to said wheel support member.

3. A rear wheel suspension for a vehicle comprising:
   a chassis;
   a wheel support member;
   an upwardly extending telescopic shock absorber having its lower end rigidly secured to said wheel support member;
   means pivotably connecting the upper end of said shock absorber to said chassis;
   transversely extending front and rear control arms pivotably connected at their inboard ends to said chassis and at their outboard ends to said wheel support member;
   a spring seat located between and pivotably connected to said front and rear control arms such that said control arms are allowed to pivot relative to said spring seat means about a substantially longitudinally extending axis during jounce and rebound movement of said road wheel and to pivot relative to said spring seat means about substantially vertical axes as said wheel support member recesses; and
   a transverse leaf spring interposed between said spring seat and said chassis with said leaf spring attached to said chassis at a laterally inward position from said spring seat.

4. A rear suspension as defined in claim 3 wherein:
   said spring seat is pivotably connected to said front and rear arms by a bushing means;
   said busing means is constructed to allow pivotable movement of said spring seat about a substantially longitudinally extending axis;
   said bushing means also is constructed to resiliently allow pivotable movement of said spring seat about a vertical axis.

5. A rear wheel suspension as defined in claim 4 wherein said bushing means are longitudinally aligned.

6. A rear wheel suspension as defined in claim 4 further comprising:
   a longitudinal link having one end connected to said chassis and its other end connected to said wheel support member.

7. A rear wheel suspension for a vehicle comprising:
   a chassis;
   a wheel support member;
   transversely extending front and rear control arms pivotably connected at their inboard ends to said chassis and at their outboard ends to said wheel support member;
   a spring seat located between and pivotably connected to said front and rear control arms whereby said control arms are allowed to pivot relative to said spring seat about substantially vertical axes as said wheel support member recesses; and
   a transverse leaf spring interposed between said spring seat and said chassis with said leaf spring attached to said chassis at a laterally inward position from said spring seat means.

8. A rear wheel suspension as defined in claim 7 wherein:
   said spring seat is pivotably connected to said front and rear arms by a bushing means;
   each of said bushing means is constructed to allow pivotable movement of said spring seat about a longitudinally extending axis;
   said bushing means also is constructed to resiliently allow pivotable movement of said spring seat about a vertical axis.

9. A rear wheel suspension for a vehicle comprising:
   a chassis;
   a wheel support member being adapted to rotatably mount a wheel;
   an upwardly extending telescopic shock absorber having its lower end rigidly secured to said wheel support member;
   means pivotably connecting the upper end of said shock absorber to said chassis;
   transversely extending front and rear control arms pivotably connected at their inboard ends to said chassis and at their outboard ends to said wheel support member;
   said wheel support member being constructed to support said wheel in a position longitudinally between where the otuboard ends of said arms are connected to said wheel support member;
   means for seating a transverse leaf spring interposed between said arms and said chassis and distributing the spring load onto both of said control arms; and
   bushing means connecting said spring seat means to said control arms such that said control arms are allowed to pivot relative to said means for seating a leaf spring about substantially vertical axes as said wheel support member recesses.

* * * * *